United States Patent
Li et al.

(10) Patent No.: US 12,375,293 B2
(45) Date of Patent: Jul. 29, 2025

(54) VERIFICATION OF A PUBLISHED IMAGE HAVING A PREDEFINED PORTION THAT HAS BEEN ALTERED BY A CLOUD PROVIDER PRIOR TO BEING MADE AVAILABLE VIA A MARKETPLACE OF THE CLOUD PROVIDER

(71) Applicant: NetApp, Inc., San Jose, CA (US)

(72) Inventors: Nan Li, San Marino, CA (US); James Silva, Bedford, MA (US); Sangramsinh Pandurang Pawar, Bedford, MA (US); Jing Zhang, Malden, MA (US)

(73) Assignee: NetApp, Inc., San Jose, CA (US)

( * ) Notice: Subject to any disclaimer, the term of this patent is extended or adjusted under 35 U.S.C. 154(b) by 322 days.

(21) Appl. No.: 18/184,239

(22) Filed: Mar. 15, 2023

(65) Prior Publication Data
US 2024/0313977 A1    Sep. 19, 2024

(51) Int. Cl.
*H04L 9/32*     (2006.01)
*G06F 8/61*     (2018.01)
(Continued)

(52) U.S. Cl.
CPC .............. *H04L 9/3247* (2013.01); *G06F 8/63* (2013.01); *G06F 8/71* (2013.01); *H04L 9/30* (2013.01)

(58) Field of Classification Search
CPC . H04L 9/3247; H04L 9/30; G06F 8/63; G06F 8/71; G06F 21/50
See application file for complete search history.

(56) References Cited

U.S. PATENT DOCUMENTS

| | | | | |
|---|---|---|---|---|
| 6,108,420 A | * | 8/2000 | Larose | G06F 21/16 705/59 |
| 11,650,906 B2 | * | 5/2023 | Creel | G06F 11/3612 717/130 |

(Continued)

OTHER PUBLICATIONS

EI-Hadedy et al.; "An Efficient Authorship Protection Scheme for Shared Multimedia Content", 2011, IEEE, Sixth International Conference on Image and Graphics, pp. 914-919. (Year: 2011).*

(Continued)

*Primary Examiner* — Matthew Smithers
(74) *Attorney, Agent, or Firm* — Jaffery Watson Hamilton & DeSanctis LLP

(57) ABSTRACT

Systems and methods for verifying an executable portion of a published cloud image represents an unaltered version of an executable portion of a corresponding original cloud image are provided. In one embodiment, modification of a predefined portion of a cloud image by a cloud provider prior to its publication via a marketplace of the cloud provider is proactively addressed as part of (i) an automated signing process performed by a software publisher on the original cloud image prior to delivery to the cloud provider and (ii) a corresponding background verification process performed on the published cloud image on behalf of users by a management platform. The signing and verification processes are operable to exclude the predefined portion when creating their respective digests, thereby allowing the signed digest created prior to the modification to remain useful as part of a subsequent digest comparison performed by the verification process.

20 Claims, 6 Drawing Sheets

(51) Int. Cl.
  *G06F 8/71* (2018.01)
  *H04L 9/30* (2006.01)

(56) References Cited

U.S. PATENT DOCUMENTS

| | | | | |
|---|---|---|---|---|
| 2001/0051928 | A1* | 12/2001 | Brody | G06F 21/16 705/52 |
| 2005/0071633 | A1* | 3/2005 | Rothstein | G06F 21/51 713/167 |
| 2005/0148445 | A1* | 7/2005 | Carle | A63B 21/08 482/99 |
| 2006/0026569 | A1* | 2/2006 | Oerting | G06F 21/51 717/173 |
| 2006/0161761 | A1* | 7/2006 | Schwartz | G06F 21/64 711/216 |
| 2014/0040873 | A1* | 2/2014 | Goldman | H04L 9/3263 717/168 |
| 2015/0046497 | A1* | 2/2015 | Campbell, Jr | G06F 16/9014 707/802 |
| 2015/0254451 | A1* | 9/2015 | Doane | G06F 21/44 726/1 |
| 2017/0116427 | A1* | 4/2017 | Major | G06F 21/57 |
| 2018/0204006 | A1* | 7/2018 | Barr | G06F 21/572 |
| 2019/0312735 | A1* | 10/2019 | Tong | G06Q 10/103 |
| 2020/0125532 | A1* | 4/2020 | Ren | G06F 16/137 |
| 2020/0310775 | A1* | 10/2020 | Nyamars | G06F 8/60 |
| 2021/0058249 | A1* | 2/2021 | Jeon | H04L 9/0643 |
| 2022/0083640 | A1* | 3/2022 | Duval | G06F 21/64 |
| 2022/0141033 | A1* | 5/2022 | Yaffe | H04L 9/3247 713/168 |
| 2023/0006833 | A1* | 1/2023 | Stolbikov | H04L 9/3239 |

OTHER PUBLICATIONS

"Securing the Software Supply Chain: Recommended Practices for Developers," Enduring Security Framework, Aug. 2022, pp. 1-64.
"Securing the Software Supply Chain: Recommended Practices for Suppliers," Enduring Security Framework, Sep. 2022, pp. 1-45.
Google Cloud., "Creating and Validating Digital Signatures," Cloud KMS Documentation, 2023, pp. 1-6. Retrieved from URL: Https://cloud.google.com/kms/docs/create-validate-signatures.
Google Cloud., "Digital signatures," Cloud KMS Documentation, 2023, pp. 1-3. Retrieved from URL: Https://cloud.google.com/kms/docs/digital-signatures.
Netapp., "Google Cloud image verification overview," NetApp Documentation, pp. 1-2. Retrieved from URL: Https://docs.netapp.com/US-en/cloud-manager-cloud-volumes.ontap/concept-gcp-image-verification.html.
Netapp., "Google Cloud Platform Image Verification," Cloud volumes ONTAP, Mar. 2023, pp. 1-15. Retrieved from URL: Https://docs.netapp.com/us-en/cloud-manager-cloud-volumesontap/concept-gcp-image-verification.html.
The White House., "Executive Order on Improving the Nation's Cybersecurity," Federal Register, May 2021, vol. 86(93), pp. 26633-26647.
Young S.D., "Enhancing the Security of the Software Supply Chain Through Secure Software Development Practices," Memorandum for the Heads of Executive Departments and Agencies, Sep. 2022, pp. 1-8.

* cited by examiner

VERIFICATION OF A PUBLISHED IMAGE HAVING A PREDEFINED PORTION THAT HAS BEEN ALTERED BY A CLOUD PROVIDER PRIOR TO BEING MADE AVAILABLE VIA A MARKETPLACE OF THE CLOUD PROVIDER

BACKGROUND

Field

Various embodiments of the present disclosure generally relate to automated means for enhancing software supply chain security and prevention of cyber incidents. In particular, some embodiments relate to facilitating the verification of an image file of a software product published to a marketplace of a cloud provider in which alterations are made by the cloud provider to a predefined portion of the image file prior to publication thereof.

Description of the Related Art

Cloud provider marketplaces (e.g., Microsoft Azure marketplace, Google Cloud Platform (GCP) marketplace, and Amazon Web Services (AWS) marketplace) provide customers (users) with access to software applications and/or services (which may be collectively referred to herein as software products) that may be built on, integrate with, or complement the cloud provider's offerings. Such software products may include native cloud applications (e.g., NetApp Cloud Volumes ONTAP by NetApp, Inc. of San Jose, CA) and approved apps that have been created by third-party developers (or software publishers).

Prior to delivering a cloud image to a cloud marketplace for publication, a software publisher may create a signed digest (or signature) of the cloud image using a private key of the software publisher, thereby allowing a user that obtains the published version of the cloud image from the cloud marketplace to verify the published cloud image represents an unaltered version of the original cloud image created by the software publisher. For example, the user may compare a first digest extracted from the signed digest using a corresponding public key of the software publisher to a second digest of the published cloud image.

SUMMARY

Systems and methods are described for verifying an executable portion of a published cloud image file represents an unaltered version of an executable portion of a corresponding original cloud image file. According to one embodiment, a signed digest associated with the original cloud image file of a software product of a software publisher may be downloaded from the software publisher. The original cloud image file includes an executable portion and a non-executable portion. The signed digest is created by excluding the non-executable portion. A published version of the software product may be downloaded in a form of the published cloud image file from a marketplace of a cloud provider. The published cloud image file includes an executable portion and a non-executable portion. The non-executable portion of the published cloud image file is modified by the cloud provider during staging and/or publication of the published version of the software product to the marketplace. The executable portion of the published cloud image file is verified to represent an unaltered version of the executable portion of the original cloud image file by: (i) extracting a first digest from the signed digest by using a public key of the software publisher; and (ii) creating a second digest of the published image file by excluding the non-executable portion of the published cloud image file; and (iii) comparing the first digest to the second digest.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
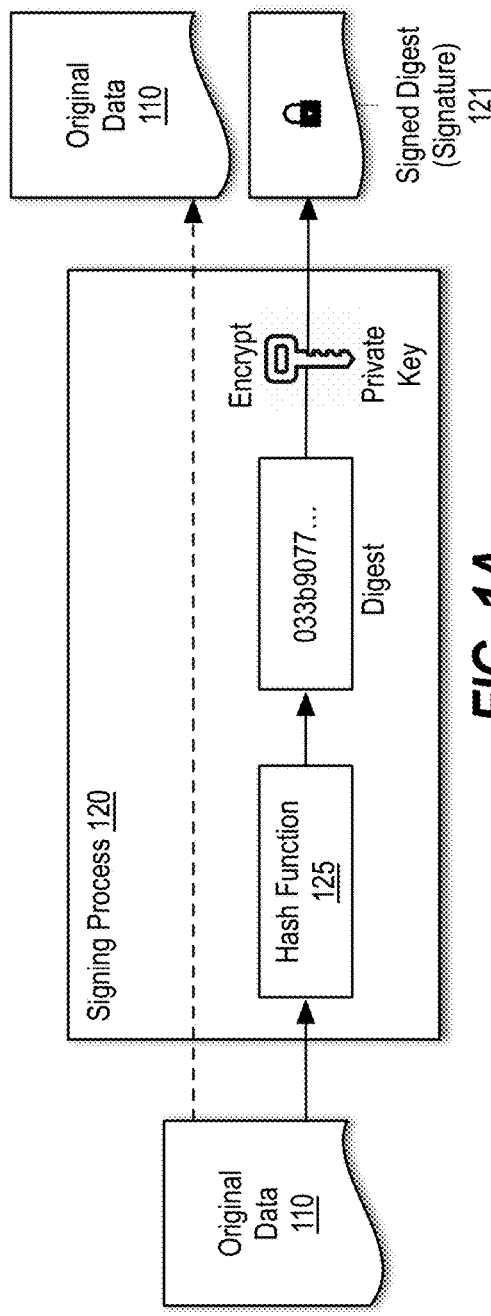
FIG. 1A is a block diagram conceptually illustrating a signing process.

Systems and methods are described for verifying an executable portion of a published cloud image file represents an unaltered version of an executable portion of a corresponding original cloud image file. Executive Order (EO) 14028, "Improving the Nation's Cybersecurity" and subsequently released recommended practice guides associated therewith published by the Cybersecurity and Infrastructure Security Agency (CISA), the National Security Agency, and the Office of the Director of National Intelligence (ODNI) provide examples of threat scenarios and recommended mitigations. EO 14028 and the subsequently released recommended practice guides may be collectively referred to as EO 14028 herein. An example of a recommended mitigation by EO 14028 is "[d]eliver digitally signed code and associated supporting files using a code-signing system that protects sensitive signing keys and that uses hardware protection such as a Federal Information Processing Standards (FIPS) 140-2/ -3 Hardware Security Module (HSM)."

While both signing and verification of a cloud image file is conceptually fairly straightforward when the cloud provider does not make any alterations to the original cloud image file prior to publication to the cloud marketplace, there are situations in which a cloud provider may have a need to modify a defined non-executable portion (e.g., metadata contained in a header, footer, leading portion, or trailing portion) of the cloud image file, for example, for accounting and/or self-protection purposes. Such an alteration, however, destroys the ability of the pre-modification signed digest to be used in connection with verifying the published cloud image.

As such, embodiments described herein seek to improve the technological processes of image signing and verification to proactively address the modification of a predefined portion of a cloud image by a cloud provider prior to the cloud provider making the cloud image available for consumption by users via a marketplace of the cloud provider. Various embodiments of the present technology provide a range of technical effects, advantages, and/or improvements to image signing and verification. For example, by proactively excluding the predefined portion from a pre-publication signing process performed on an original cloud image file and correspondingly excluding the predefined portion from a post marketplace acquisition verification process performed on the published cloud image, the usefulness of a first digest extracted from the signed digest produced by the pre-publication signing process and a second digest generated based on the published cloud image as part of a digest comparison performed by the verification process is retained despite the modification. Additionally, by periodically performing an automated and scheduled image verification process in the background by a management platform, the efficiency of deploying the software product may be enhanced by hiding the latency of various asynchronous processes, including, for example, the downloading of multi-GB published cloud image files.

While various examples herein are described with reference to a cloud image file that includes a predefined portion that may be altered by a cloud provider during staging and/or publication to a marketplace of the cloud provider, it is to be appreciated the methodologies described herein are also applicable to scenarios in which the cloud image file has multiple predefined portions that may be altered by cloud provider.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability and mobility (e.g., cloud bursting for load balancing between clouds).

As used herein, a "cloud service provider" or a "cloud provider" generally refers to the owner, manager, and/or operator of a cloud or cloud platform. A cloud provider may be a business, academic, or government organization, or some combination of them. Non-limiting examples of clouds or cloud platforms and their respective cloud providers include Azure provided by Microsoft, Google Cloud Platform (GCP) provided by Google, Amazon Web Services (AWS) provided by Amazon, Oracle Cloud Infrastructure provided by Oracle, and IBM Cloud provided by IBM.

Example Signing Process

FIG. 1A is a block diagram conceptually illustrating a signing process 120. The signing process 120 may be used to generate a signed digest 111 (or a signature) of the input data (e.g., original data 110). In various examples described herein the input data comprises an original cloud image file built by a software publisher and representing a software product of the software publisher. In order to comply with the recommended mitigations of EO 14028, a software producer may create a signed digest 111 for each version of a software product that will be published to a cloud marketplace, thereby allowing users that obtain the published version of the software product from the cloud marketplace to verify that the published cloud image file represents an unaltered version of the original cloud image file.

In the context of the present example, the signing process 120 includes a hash function 125 (e.g., a message-digest (MD) algorithm or a cryptographic hash algorithm). The hash function 125 generally represents a one-way hashing procedure that maps input data (e.g., original data 110) of an arbitrary length to an output (e.g., a digest, a hash value, or a checksum) of fixed length. The hash function 125 is designed to protect the integrity of the input data to detect changes or alterations to any part of the input data. Applying the hash function 125 to the same input data will always result in the same output. Similarly, if the input data is modified, the output of the hash function 125 is different. Non-limiting examples of the hash function 125 include the MD5 message-digest algorithm, the MD6 message-digest algorithm, secure hash algorithm 2 (SHA-2), SHA-3, BLAKE3 and SHA-256.

A private key (also known as a secret key of a public key pair) represents a variable in asymmetric (public key) cryptography that may be used with an algorithm (not shown) to encrypt data. In the context of the present example, the owner (e.g., a software publisher) of a public key pair uses their private key to generate the signed digest 111 by encrypting the digest with the private key. As described further below with reference to FIG. 1B, anyone with access to the public key of the public key pair can decrypt the signed digest 111.

As described further below, in order to accommodate the alteration of a predetermined portion (e.g., leading or trailing metadata) of the original data (e.g., an original cloud image file) by the cloud provider as the cloud image file is staged and/or published to a marketplace of the cloud provider, the input to the signing process may be modified to exclude the predetermined portion.

Example Verification Process

Figure 1B:
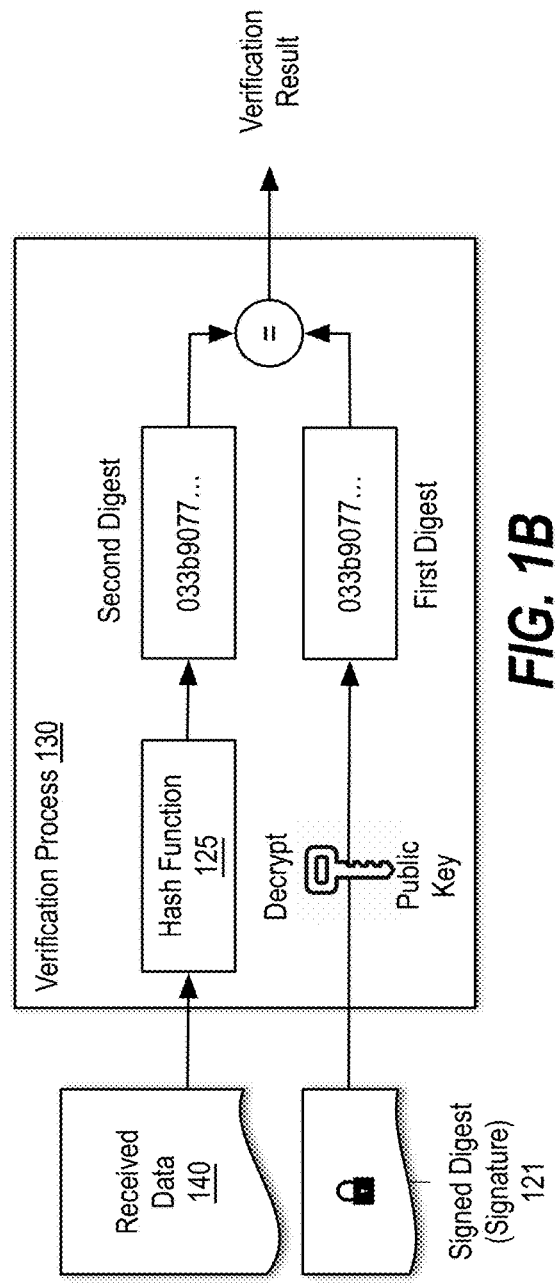
FIG. 1B is a block diagram conceptually illustrating a verification process corresponding to the signing process of FIG. 1A.

FIG. 1B is a block diagram conceptually illustrating a verification process 130 corresponding to the signing process 120 of FIG. 1A. The verification process 130 operates on two pieces of data (i.e., received data (e.g., received data 140) and the signed digest 111 associated with the original data) and outputs a verification result indicative of whether the received data represents an unaltered version of the original data (e.g., original data 110). In the context of a software distribution chain in which a cloud provider distributes a software product of a software publisher via a marketplace of the cloud provider, the verification process 130 may be used to verify a published version of the software product in the form of a published cloud image file represents an unaltered version of an original cloud image file representing the software product and built by the software publisher. That is, the verification process 130 may be used to verify no alterations were made to the cloud image file after the time it was delivered to the cloud provider.

The verification process 130 makes use of the same hash function (e.g., hash function 125) as employed by the signing process (e.g., signing process 120). A first digest may be extracted by decrypting the signed digest 111 with the public key corresponding to the private key used to generate the signed digest 111. As described further below, the public key may be included within a public key certificate and may be obtained from the software publisher. A second digest may be generated by applying the hash function 125 to the received data. The verification process 130 may then compare the first digest to the second digest to produce the verification result. When the first and second digests match, this indicates the content of the received data and the original data are the same and the verification result is true. When the first and second digests do not match, this indicates the content of the received data and the original data are different and the verification result is false.

The verification process 130 may be performed by the user or on behalf of the user. As described further below, in one embodiment, the verification process 130 may be performed in the background by automated means in accordance with a schedule by a management platform that facilitates setting up and deploying the software product on one or more compute instances provided by the cloud provider.

As described further below, in order to accommodate the post-signing alteration of a predetermined portion (e.g., leading or trailing metadata) of the original data (e.g., an original cloud image file) by the cloud provider, resulting in a published cloud image file differing from the original cloud image file), the input to the verification process may be modified to exclude the predetermined portion.

Example Cloud Image Files

Figure 2:
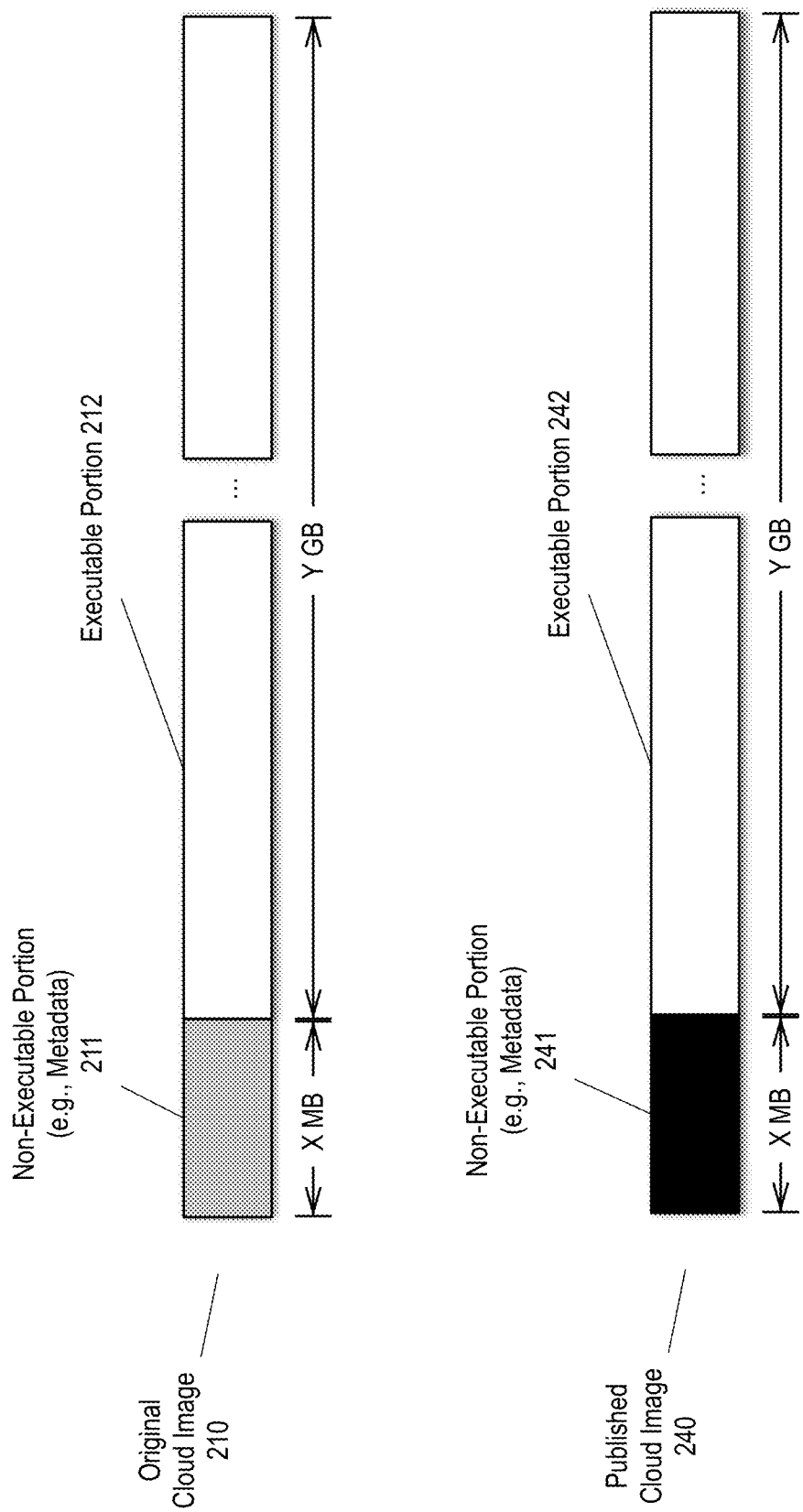
FIG. 2 is a block diagram illustrating an example of an original cloud image and a published cloud image in accordance with an embodiment of the present disclosure.

FIG. 2 is a block diagram illustrating an example of an original cloud image 210 and a published cloud image 240 in accordance with an embodiment of the present disclosure. A cloud provider may have a desire to modify a defined non-executable portion (e.g., metadata contained in a header, footer, leading portion, or trailing portion) of the published cloud image 240, for example, for accounting and/or self-protection purposes. As those skilled in the art will appreciate, when such an alteration is performed after a software publisher has created a signed digest (e.g., signed digest 111) for the original cloud image 210 (which may be analogous to original data 110), it precludes effective usage of the traditional approach (e.g., verification process 130) for verifying the published cloud image 240 (which may be analogous to received data 140) represents an unaltered version of the original cloud image 210.

In the context of the present example, the original cloud image 210 includes a predetermined portion (e.g., a non-executable portion 211, which may represent metadata) of X megabytes (MB) and an executable portion 212 of Y gigabytes (GB). The original cloud image 210 may represent a cloud image file built by a software publisher and representing a software product of the software publisher that is to be distributed to users via a marketplace of a cloud provider. Similarly, the published cloud image 240 includes a predetermined portion (e.g., a non-executable portion 241, which may represent metadata) of X megabytes (MB) and an executable portion 242 of Y gigabytes (GB). The published cloud image 210 may represent a copy of the cloud image 210 in which the non-executable portion 241 has been altered by the cloud provider during staging or publication to the marketplace of the cloud provider. Depending on the cloud marketplace through which the software product is to be distributed to users, the original cloud image 210 and the published cloud image 240 may represent Virtual Hard Disk (VHD) files, Amazon Machine image (AMI) files, raw disk images (e.g., files having a .raw extension, which may be referred to herein as "RAW files"), or other current or future formats that may be used for virtual hard disks.

In order to accommodate alteration of the non-executable portion 241 of the published cloud image 240, according to one embodiment, the input to the signing process (e.g., signing process 120) and the input to the verification process may exclude the respective non-executable portions 211 and 241 of the original cloud image 210 and the published cloud image 240. For example, the original cloud image 210 may be truncated to remove the non-executable portion 211 from the original cloud image 210 or the non-executable portion 211 may otherwise be stripped from the original cloud image 210 by the software publisher before invoking the signing process (e.g., signing process 120). In this manner, the original data 110 input to the signing process excludes the non-executable portion 211, thereby causing the predefined portion of the original cloud image 210 (which will differ from the predefined portion of the published cloud image 240 as a result of one or more alteration(s) made by the cloud provider) to be ignored for purposes of generating the signed digest 111. Similarly, the published cloud image 240 may be truncated to remove the non-executable portion 241 from the published cloud image 240 or the non-executable portion 241 may otherwise be stripped from the published cloud image 240 by the software publisher before invoking the verification process. In this manner, the received data 140 input to the verification process excludes the non-executable portion 241, thereby causing the predefined portion of the published cloud image 240 that is altered by the cloud provider to be ignored for purposes of generating the second digest, which is compared to the first digest to determine the verification result.

While in the present example the predefined portion of the published cloud image 240 that is altered by the cloud provider during staging and/or publication to the marketplace of the cloud provider is assumed to be the leading X MB, it is to be appreciated the approach described herein is applicable regardless of the location of the non-executable portions 211 and 241 within the respective cloud images 210 and 240. For example, the non-executable portions 211 and 241 may be located at the end of the respective cloud images 210 and 240 or may be located at a predetermined byte offset from the beginning or the end of the respective cloud images 210 and 240. Similarly, while in the context of the present example, it is assumed there is only one predefined portion of the published cloud image 240 that is altered, it is contemplated that more than one predefined portion of the published cloud image 240 may be altered.

Example Operating Environment

Figure 3:
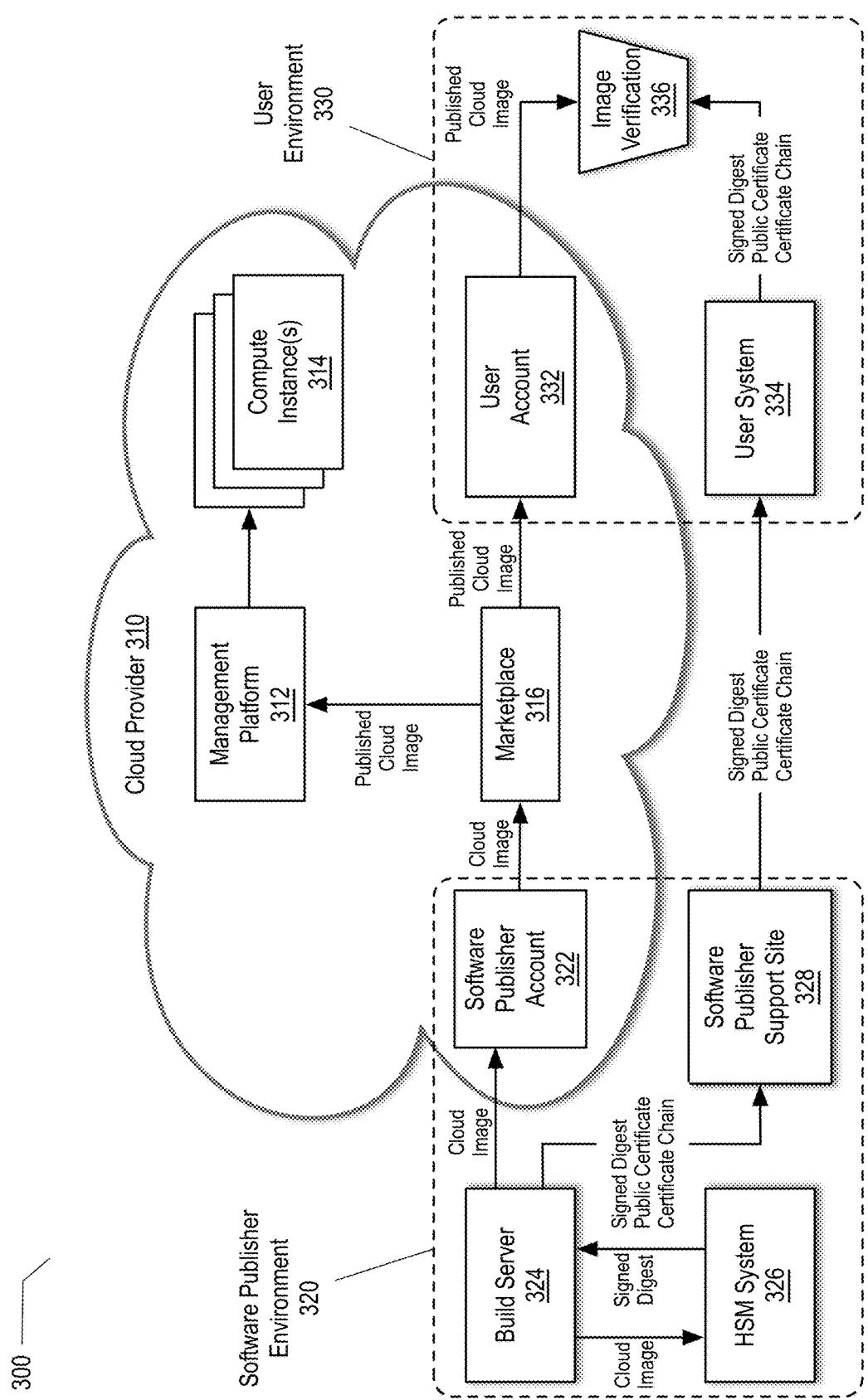
FIG. 3 is a block diagram illustrating an operating environment in which various embodiments of the present disclosure may be employed.

FIG. 3 is a block diagram illustrating an operating environment 300 in which various embodiments of the present disclosure may be employed. In various examples described herein, a software product of a software publisher is assumed to be distributed to users via a marketplace 316 of a cloud provider 310 in the form of a published cloud image (e.g., published cloud image 240), which represents a copy of an original cloud image (e.g., cloud image 210) provided by the software publisher but including one or more alterations made by the cloud provider to a predefined portion (e.g., non-executable portion 241) of the published cloud image.

In the context of the present example, the operating environment 300 includes a software publisher environment 320, a cloud provider 310, and a user environment 330. The cloud environment of the cloud provider 310 may include a software publisher account 322, a management platform 312, compute instance(s) 314, a marketplace 316, and a user account 332. The marketplace 316 generally represents an online storefront that is operated by the cloud provider 310, through which users (customers) may find, buy, and use, among other things, Software as a Service (SaaS) applications, research datasets, and software and services that may be deployed and run in the cloud environment, for example, on virtual machines (VMs) or containers hosted by one or more of the compute instance(s) 314. For example, the marketplace 316 may provide users with access to a software-defined storage offering (e.g., NetApp Cloud Volumes ONTAP (CVO)) developed by a third party (e.g., NetApp, Inc. of San Jose, CA) that delivers advanced data management for file and block workloads.

The management platform 316 may represent a cloud-based platform (provided by the same or a different software publisher as the software product) through which a user has the ability to set up and deploy the software product on the one or more compute instance(s) 314 provided by the cloud provider 310. In the background and in accordance with a predetermined or configurable schedule, the management platform 316 may periodically download all versions of the software product supported by the management platform 316 and for each version perform the verification process to verify whether the executable portion of the published cloud image represents an unaltered version of the executable portion of the original cloud image. The result of the verification process may be presented within a user interface of the management platform 316, for example, as shown and described in connection with FIG. 5. According to one embodiment, the management platform 312 represents an enterprise-class, SaaS-based management platform (e.g., BlueXP available from NetApp, Inc. of San Jose, CA) that enables users (e.g., Information Technology (IT) experts and cloud architects) to centrally manage their hybrid multi-cloud infrastructure using the software product.

The software publisher account 322 generally represents an account maintained by the software publisher with the cloud provider 310. For example, the software publisher account 322 may represent a commercial marketplace account of the software publisher that is enrolled in any relevant commercial marketplace program so as to enable the software publisher to publish the software product in the form of a cloud image via the marketplace 316.

The user account 332 generally represents an account maintained by a user or organization with the cloud provider 310. The user account 332 is typically associated with a subscription (e.g., an agreement between the user or organization and the cloud provider 310 to use resources, for which charges are either paid on a per-license basis or a cloud-based, resource-consumption basis) that links to the user account.

The software publisher environment 320 may represent a combination of on-premise resources and cloud-based resources and is shown including a build server 324, a Hardware Security Module (HSM) System 326, the software publisher account 322, and a software publisher support site 328. The HSM system 326 may represent a hardened, tamper-resistant hardware device that is responsible for generating public key pairs, securely storing private keys of the software publisher, and generating signed digests of cloud images on behalf of the build server 324 by performing a signing process (e.g., signing process 120).

The build server 324 (e.g., a continuous integration server, such as a Jenkins automation server) may be responsible for creating cloud image files based on source code committed to a repository and associated with various versions of a software product that are to be publicly released. For example, prior to uploading a cloud image to the software publisher account 322, the build server 324 may request a signed digest be generated by the HSM system 326 for a given cloud image by providing the HSM system 326 with the given cloud image and a reference to the private key to be used to create the signed digest. The build server 324 may then push the signed digest, a public key certificate (containing the public key corresponding to the private key used to create the signed digest) and a certificate chain to the software publisher support site 328.

Given the differing cloud image file formats used by respective cloud providers, an original cloud image file for a given version of the software product may be created by the software publisher for each cloud provider marketplace. For example, a first version of software product (e.g., NetApp Cloud Volumes ONTAP by NetApp, Inc. of San Jose, CA) may be caused to be published via the Azure marketplace in the form of a virtual hard drive (VHD) file, uploaded to the Azure marketplace via a corresponding software publisher account (e.g., software publisher account 322) on Azure, a second version of the software product may be caused to be published via the AWS marketplace via a corresponding software publisher account (e.g., software publisher account 322) on AWS, and a third version of the software product may be caused to be published via the GCP marketplace via a corresponding software publisher account (e.g., software publisher account 322) on GCP. Additionally, differing public key pairs may be used for each cloud provider or for each version of the software product.

In order to ensure software supply chain security (at least in terms detecting any changes potentially introduced to the executable portion (e.g., executable portion 242) of the original cloud image built by the software publisher between delivery to the marketplace 316 and receipt of the published cloud image by a user), a verification process (e.g., verification process 130) should be performed based on a signed digest (e.g., signed digest 111) of the original cloud image (excluding the non-executable portion (e.g., non-executable portion 211)) created by the software publisher and the published cloud image (excluding the non-executable portion (e.g., non-executable portion 241)). The software publisher support site 328 may be responsible for maintaining a mapping of each version of the software product for each cloud provider to corresponding signed digests, public certificates, and certificate chains and allowing users to retrieve a signed digest, public certificate, and certificate chain for a given version of the software product targeted for a particular cloud provider, thereby facilitating performance of the verification process by or on behalf of the user. For example, the user may perform a manual image verification process (e.g., image verification 336) or the management platform 312 may perform an automated image verification for all versions of the software product it supports in the background in accordance with a predefined or configurable schedule (e.g., every X hours or every Y days).

The user environment 330 may represent a combination of on-premise resources and cloud-based resources and is shown including the user account 332, a user system 334, and a manual image verification process 336. Through interactions with the marketplace 316 via the user account 332, a user may purchase a software product of a software publisher provided in a form of a published cloud image, which may be stored on the user system 334 (e.g., a workstation, a personal computer, or a laptop computer). The signed digest, public certificate, and certificate chain corresponding to the version of the software product of the published cloud image may be downloaded to the user system 334 from the software publisher support site 328. Before setting up and deploying the software product, for example, to run on one or more of the compute instance(s) 314 via the management platform 312, the user would typically manually perform the image verification 336 to verify the published cloud image represents an unaltered version of the original cloud image. This manual verification process has a number of disadvantages. For example, it is somewhat complex and involves a number of steps. In the context of the Azure marketplace, for instance, the user would need to:

Create a new manage disk from the marketplace image;

Export a VHD from the managed disk to Azure storage (e.g., user account 332);

Download the generated image to a user system (e.g., user system 334);

Cleanup the managed disk;

Download the signed digest (e.g., signed digest 111), the corresponding public key certificate file, and the corresponding chain certificate file from the software publisher support site (e.g., software support site 328);

Verify the chain of trust;

Extract the public key from the public key certificate;

Use the extracted public key to decrypt the signed digest to obtain the unencrypted digest (the first digest)

Create a new unencrypted digest (the second digest) of a temporary file created from the image file with the predetermined portion (e.g., the leading X MB) removed.

Compare the first digest to the second digest, for example, with the following general form of OpenSSL command:

○ openssl dgst -verify <public_key> -keyform <form> <hash_function> -
signature <digest_file> -binary <temporary_file>

The OpenSSL CLI tool returns a "Verified OK" message if both the files match and "Verification Failure" if they don't.

The steps involved may differ based on the file format of the cloud images at issue and the cloud provider at issue, thereby also making the process error prone. Additionally, the multi-GB size of the public cloud image makes this process time consuming potentially with long periods of waiting between various steps. Furthermore, given a predefined portion (e.g., non-executable portion 241) of the published cloud image has been altered by the cloud provider 310 and the software publisher has proactively generated a signed digest for the original cloud image that does not consider the predefined portion, the manual verification process will become more cumbersome.

In view of the foregoing, in one embodiment, a proposed solution involves automating the verification process as described further below with reference to FIG. 4. For example, the management platform may periodically perform an automated and scheduled image verification process in the background and display the verification results via a graphical user interface.

Example Automated Verification Process

Figure 4:
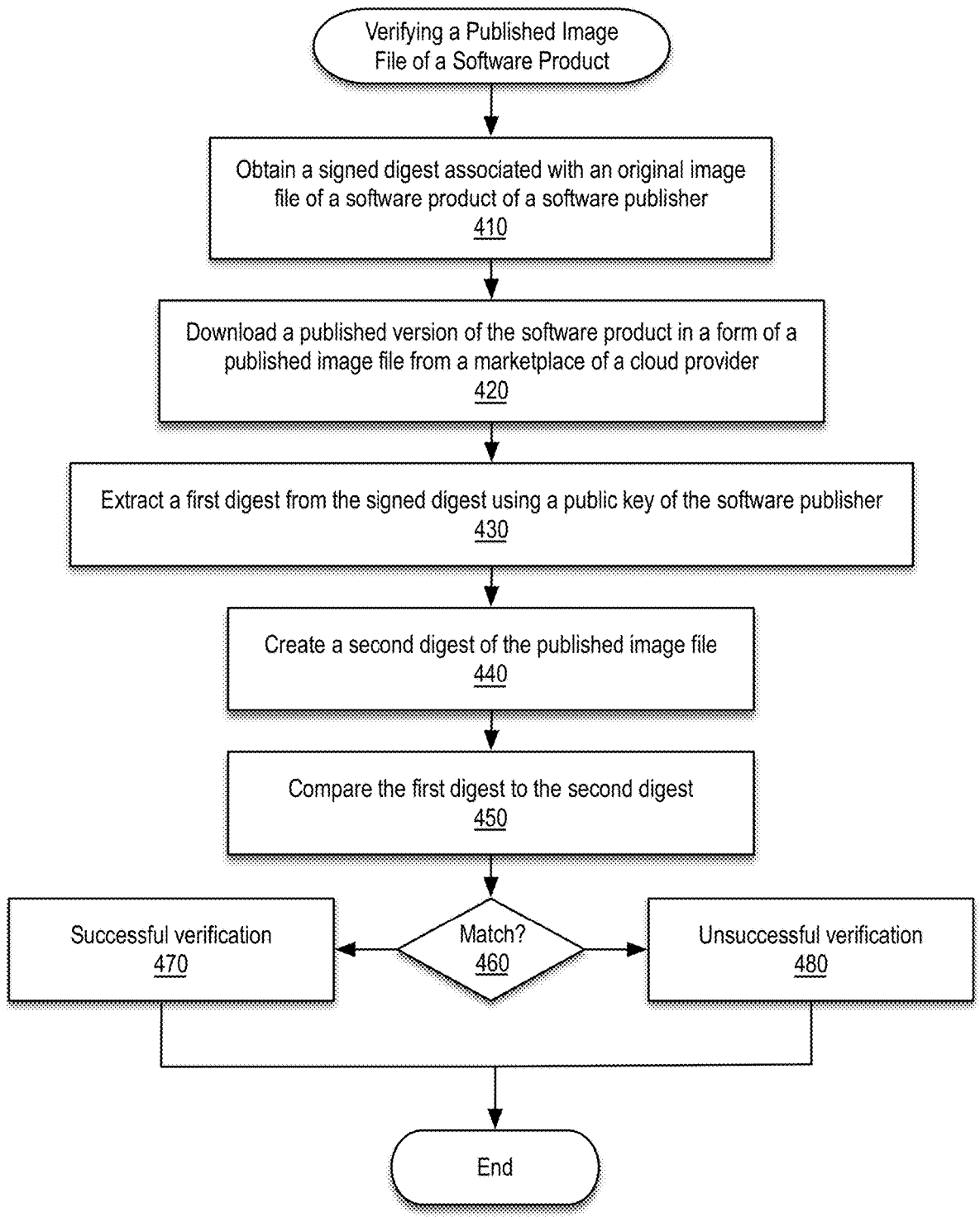
FIG. 4 is a flow diagram illustrating a set of operations for verifying a published image file of a software product in accordance with an embodiment of the present disclosure.

FIG. 4 is a flow diagram illustrating a set of operations for verifying a published image file of a software product in accordance with an embodiment of the present disclosure. In the context of the present example, it is assumed a cloud provider (e.g., cloud provider 310) alters a predefined portion (e.g., non-executable portion 241) of a published image file (e.g., published cloud image 240) during staging and/or publication to a marketplace (e.g., marketplace 316) of the cloud provider. As a result of the alteration, a predefined portion (e.g., non-executable portion 211) of an original image file (e.g., original cloud image 210) will differ from the predefined portion of the published image file and a traditional signing process involving the entirety of the original image file followed by a traditional verification process involving the entirety of the published image file will fail despite the content of respective executable portions (e.g., executable portions 212 and 242) matching. It is further assumed, in order to accommodate such alteration of the predefined portion of the published image file by the cloud provider, a software publisher has proactively altered the input to the signing process to exclude the predefined portion.

As such, the verification process described below may be used to specifically verify whether the executable portion (e.g., executable portion 242) of the published image file represents an unaltered version of the corresponding executable portion (e.g., executable portion 212) of the original image file. In one embodiment, the verification process described with reference to FIG. 4 may be periodically performed in the background by a management platform (e.g., management platform 312)) through which a user has the ability to set up and deploy the software product on one or more compute instances (e.g., compute instance(s) 314) of a cloud provider (e.g., cloud provider 310).

At block 410, a signed digest (e.g., signed digest 111) associated with the original image file of a software product of a software publisher is obtained. There are a variety of ways the management platform might obtain the signed digest. For example, the signed digest may be proactively pushed to the management platform from a software publisher environment (e.g., software publisher environment 320) as it is provided to a software publisher support site (e.g., software publisher support site 328) or the management platform may pull the signed digest from the software publisher support site.

At block 420, a published version of the software product in a form of the published image file is downloaded from the cloud provider marketplace. In one embodiment, the management platform may periodically download each version of the software product supported by the management platform in accordance with a predefined or configurable schedule (e.g., every X hours).

At block 430, a first digest is extracted from the signed digest using a public key (i.e., the public key corresponding to the private key used to create the signed digest) of the software publisher. For example, the public key may be used to decrypt the signed digest as shown in FIG. 1B.

At block 440, a second digest of the published image file is created. As noted above, the predefined portion (modified by the cloud provider) of the published image file should be excluded from the process of creating the second digest. Assuming, the predefined portion represents a leading X MB of the published image file, in one embodiment, a temporary file may be created by removing the leading X MB of the published image file. Then, the second digest may be generated by inputting the temporary file to the same hash function (e.g., hash function 125) that was used during the signing process to create the digest of the original image file as shown in FIG. 1B.

At block 450, the first digest is compared to the second digest.

At decision block 460, it is determined whether the first digest matches the second digest. If so, processing continues with block 470; otherwise, processing branches to block 480.

At block 470, the verification has been successful (i.e., the executable portion of the published image file has been confirmed to represent an unaltered version of the executable portion of the original image file). In one embodiment, the management platform may store a current timestamp and the verification result for presentation to a user via a graphical user interface of the management platform, thereby allowing the user to avoid performance of a manual process to verify the published image file. A non-limiting example of a screen shot illustrating the presentation of verification results via a user interface of a management platform is described further below with reference to FIG. 5.

At block 480, the verification has been unsuccessful (i.e., the executable portion of the published image file has been determined to represent an altered version of the executable portion of the original image file). As above, in one embodiment, the management platform may store a current timestamp and the verification result for presentation to a user via a graphical user interface of the management platform, thereby alerting the user of the potential security issue.

While in various examples described herein, it is assumed a cloud provider (e.g., cloud provider 310) alters or may alter a predefined portion (e.g., non-executable portion 241) of a published image file (e.g., published cloud image 240)

during staging and/or publication to a marketplace (e.g., marketplace 316) of the cloud provider, the methodologies described herein are equally applicable to scenarios in which multiple predefined portions of the published image are altered or alterable by the cloud provider by modifying the signing process and verification process accordingly to exclude consideration of such alterable portions.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

Example Presentation of Verification Results

Figure 5:
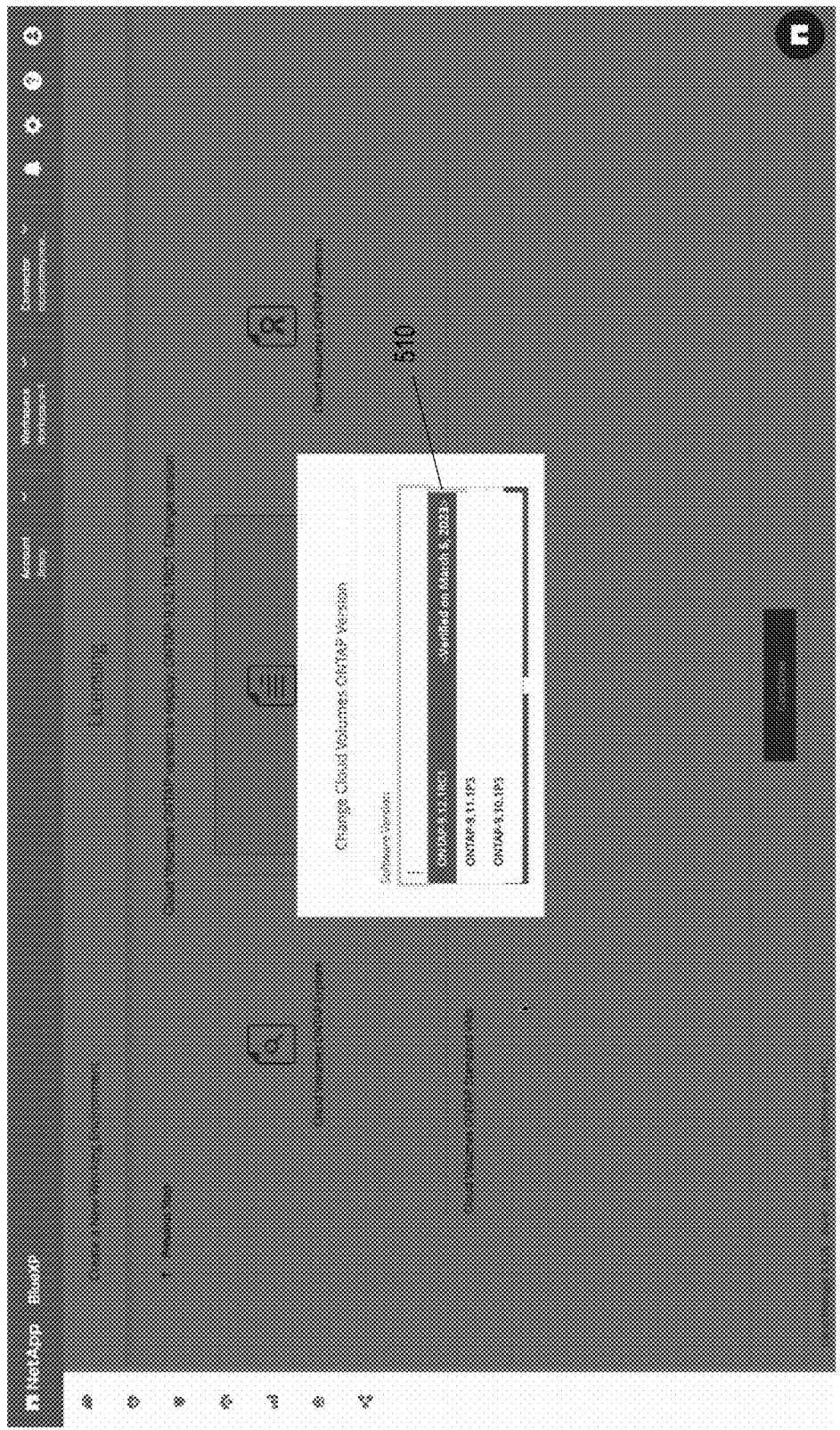
FIG. 5 is a screen shot illustrating presentation of automated and scheduled image verification results via a user interface of a management platform in accordance with an embodiment of the present disclosure.

FIG. 5 is a screen shot 500 illustrating presentation of automated and scheduled image verification results via a user interface of a management platform in accordance with an embodiment of the present disclosure. In the context of the present example, a non-limiting example of a user interface of a management platform (e.g., BlueXP available from NetApp, Inc. of San Jose, CA) is shown in which a verification result 510 of a given software version of a software product (e.g., NetApp Cloud Volumes ONTAP by NetApp, Inc. of San Jose, CA) is presented alongside the given software version, for example, as part of an end user selecting among a number of available software versions of the software product for deployment.

In this example, an automated and scheduled image verification process (e.g., verification process 130) is assumed to be performed on a daily basis. As such, the verification result 510 indicates the date on which the software version at issue was verified. To the extent the automated and scheduled image verification process is performed more frequently, the verification result 510 may additionally include information indicative of a time at which the verification was completed.

While in this example, only a single verification result is shown, it is to be appreciated a verification result may be presented for each of multiple software versions of the software product.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 6:
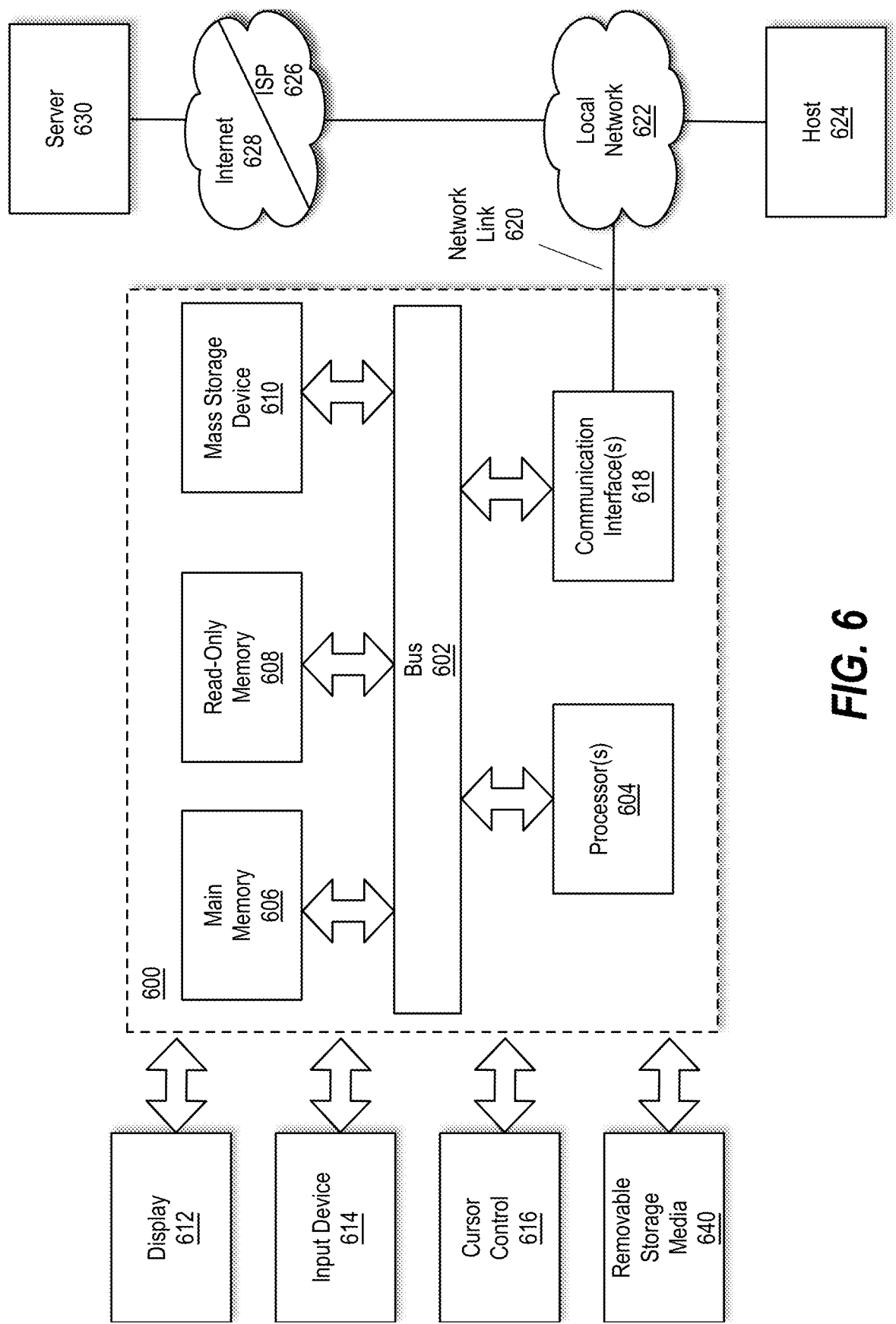
FIG. 6 illustrates an example computer system in which or with which embodiments of the present disclosure may be utilized.

FIG. 6 is a block diagram that illustrates a computer system 600 in which or with which an embodiment of the present disclosure may be implemented. Computer system 600 may be representative of all or a portion of the computing resources associated with a cloud environment of a cloud provider (e.g., cloud provider 310) and/or a computer system associated with a software publisher environment (e.g., software publisher environment 320) or a user environment (e.g., user environment 330). Notably, components of computer system 600 described herein are meant only to exemplify various possibilities. In no way should example computer system 600 limit the scope of the present disclosure. In the context of the present example, computer system 600 includes a bus 602 or other communication mechanism for communicating information, and a processing resource (e.g., a hardware processor 604) coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, e.g., a magnetic disk, optical disk or flash disk (made of flash memory chips), is provided and coupled to bus 602 for storing information and instructions.

Computer system 600 may be coupled via bus 602 to a display 612, e.g., a cathode ray tube (CRT), Liquid Crystal Display (LCD), Organic Light-Emitting Diode Display (OLED), Digital Light Processing Display (DLP) or the like, for displaying information to a computer user. An input device 614, including alphanumeric and other keys, is coupled to bus 602 for communicating information and command selections to processor 604. Another type of user input device is cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Removable storage media 640 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 600 may implement the techniques described herein using customized hard-wired logic, one or more ASICs or FPGAs, firmware or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 610. Volatile media includes dynamic memory, such as main memory 606. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage device 610, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method comprising:
obtaining a signed digest associated with an original image file of a software product of a software publisher, wherein the image file includes an executable portion and a non-executable portion and wherein the signed digest is created by excluding the non-executable portion;

downloading a published version of the software product in a form of a published image file from a marketplace of a cloud provider, wherein the published image file includes an executable portion and a non-executable portion, wherein the non-executable portion of the published image file is modified by the cloud provider during staging or publication of the published version of the software product to the marketplace; and verifying the executable portion of the published image file represents an unaltered version of the executable portion of the original image file by:

extracting a first digest from the signed digest by using a public key of the software publisher;

creating a second digest of the published image file by excluding the non-executable portion of the published image file; and comparing the first digest to the second digest.

2. The method of claim 1, wherein said downloading a published version, said creating, and said comparing are performed periodically in accordance with a predefined or configurable schedule.

3. The method of claim 1, wherein the method is performed in the background by a management platform through which a user has the ability to set up and deploy the software product on one or more compute instances provided by the cloud provider.

4. The method of claim 3, wherein the management platform includes a user interface through which a result of said verifying is displayed to the user.

5. The method of claim 4, wherein the method is performed in the background by the management platform for each of a plurality of versions of the software product.

6. The method of claim 1, wherein said creating a second digest includes:

creating a temporary file based on the executable portion of the published image file; and generating the second digest by applying a hash algorithm to the temporary file.

7. The method of claim 1, wherein the non-executable portion of the published image file comprises metadata included within a leading one or more megabytes of the published image file.

8. The method of claim 1, wherein the original image file and the published image file comprise Virtual Hard Disk (VHD) files.

9. The method of claim 1, wherein the original image file and the published image file comprise Amazon Machine Image (AMI) files.

10. The method of claim 1, wherein the original image file and the published image file comprise raw disk image files.

11. A system comprising:

one or more processing resources; and instructions that when executed by the one or more processing resources cause the system to:

obtain a signed digest associated with an original image file of a software product of a software publisher, wherein the image file includes an executable portion and a non-executable portion and wherein the signed digest is created by excluding the non-executable portion;

download a published version of the software product in a form of a published image file from a marketplace of a cloud provider, wherein the published image file includes an executable portion and a non-executable portion, wherein the non-executable portion of the published image file is modified by the cloud provider during staging or publication of the published version of the software product to the marketplace; and verify the executable portion of the published image file represents an unaltered version of the executable portion of the original image file by:

extracting a first digest from the signed digest by using a public key of the software publisher;

creating a second digest of the published image file by excluding the non-executable portion of the published image file; and comparing the first digest to the second digest.

12. The system of claim 11, wherein downloading of the published version, said creating, and said comparing are performed periodically in accordance with a predefined or configurable schedule.

13. The system of claim 11, wherein the system comprises a management platform through which a user has the ability to set up and deploy the software product on a compute instance provided by the cloud provider and wherein downloading of the published version, downloading of the published version, and verification of the executable portion of the published image file is performed in the background by the management platform.

14. The system of claim 13, wherein the management platform includes a user interface through which a result of the verification is displayed to the user.

15. A non-transitory machine readable medium storing instructions, which when executed by one or more processing resources of a system, cause the system to:

obtain a signed digest associated with an original image file of a software product of a software publisher, wherein the image file includes an executable portion and a non-executable portion and wherein the signed digest is created by excluding the non-executable portion;

download a published version of the software product in a form of a published image file from a marketplace of a cloud provider, wherein the published image file includes an executable portion and a non-executable portion, wherein the non-executable portion of the published image file is modified by the cloud provider during staging or publication of the published version of the software product to the marketplace; and verify the executable portion of the published image file represents an unaltered version of the executable portion of the original image file by:

extracting a first digest from the signed digest by using a public key of the software publisher;

creating a second digest of the published image file by excluding the non-executable portion of the published image file; and comparing the first digest to the second digest.

16. The non-transitory machine readable medium of claim 15, wherein downloading of the published version, said creating, and said comparing are performed periodically in accordance with a predefined or configurable schedule.

17. The non-transitory machine readable medium of claim 15, wherein the system comprises a management platform through which a user has the ability to set up and deploy the software product on a compute instance provided by the cloud provider and wherein downloading of the published version, downloading of the published version, and verification of the executable portion of the published image file is performed in the background by the management platform.

18. The non-transitory machine readable medium of claim 17, wherein the management platform includes a user interface through which a result of the verification is displayed to the user.

19. The non-transitory machine readable medium of claim 15, wherein the non-executable portion of the published image file comprises metadata included within a leading one or more megabytes of the published image file.

20. The non-transitory machine readable medium of claim 15, wherein the original image file and the published image file comprise Virtual Hard Disk (VHD) files, Amazon Machine Image (AMI) files or raw disk image files.

* * * * *